(12) United States Patent
Zhao

(10) Patent No.: US 10,904,852 B2
(45) Date of Patent: Jan. 26, 2021

(54) METHOD FOR POSITIONING PICO REMOTE RADIO UNIT AND SYSTEM FOR POSITIONING PICO REMOTE RADIO UNIT

(71) Applicant: HUAWEI TECHNOLOGIES CO., LTD., Guangdong (CN)

(72) Inventor: Jianying Zhao, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/832,799

(22) Filed: Mar. 27, 2020

(65) Prior Publication Data

US 2020/0229127 A1 Jul. 16, 2020

Related U.S. Application Data

(63) Continuation of application No. PCT/CN2018/104575, filed on Sep. 7, 2018.

(30) Foreign Application Priority Data

Sep. 30, 2017 (CN) .......................... 2017 1 0923623

(51) Int. Cl.
*H04W 64/00* (2009.01)
*H04W 88/08* (2009.01)
*H04W 84/10* (2009.01)

(52) U.S. Cl.
CPC ....... *H04W 64/003* (2013.01); *H04W 88/085* (2013.01); *H04W 84/10* (2013.01)

(58) Field of Classification Search
CPC .. H04W 64/003; H04W 88/085; H04W 84/10
See application file for complete search history.

(56) References Cited

U.S. PATENT DOCUMENTS

| 9,462,529 | B2* | 10/2016 | Siomina ................ H04W 36/08 |
| 9,549,333 | B2* | 1/2017 | Akman ................ H04W 24/10 |
| 2007/0167174 | A1* | 7/2007 | Halcrow .............. H04W 48/16 455/456.2 |
| 2008/0186234 | A1 | 8/2008 | Alles et al. | |
| 2014/0056165 | A1* | 2/2014 | Siomina .............. H04J 11/0086 370/252 |
| 2014/0162589 | A1 | 6/2014 | Gupta et al. | |

(Continued)

FOREIGN PATENT DOCUMENTS

| CN | 103501502 A | 1/2014 |
| CN | 104918265 A | 9/2015 |

(Continued)

*Primary Examiner* — Dinh Nguyen
(74) *Attorney, Agent, or Firm* — Womble Bond Dickinson (US) LLP

(57) ABSTRACT

This application describes methods and system for positioning pico remote radio units. Drive test information on a terminal side and drive test information on a network management system side are recorded when a drive test is performed, and pico remote radio unit position information and a pico remote radio unit identifier are automatically associated and bound based on the drive test information on the terminal side and the drive test information on the network management system side, to facilitate positioning of a pico remote radio unit, and to ensure efficient system operation and maintenance.

15 Claims, 9 Drawing Sheets

(56) References Cited

U.S. PATENT DOCUMENTS

| | | |
|---|---|---|
| 2015/0023180 A1* | 1/2015 | Feng .................... H04W 24/08 |
| | | 370/241.1 |
| 2015/0038160 A1 | 2/2015 | Ngai et al. |
| 2015/0131553 A1* | 5/2015 | Centonza .............. H04W 16/32 |
| | | 370/329 |
| 2015/0195518 A1* | 7/2015 | Shikii .................. H04N 17/004 |
| | | 348/148 |
| 2016/0100378 A1 | 4/2016 | Chang et al. |
| 2017/0059717 A1 | 3/2017 | Polehn et al. |
| 2018/0184272 A1* | 6/2018 | Hehn ...................... H04W 4/46 |

FOREIGN PATENT DOCUMENTS

| | | |
|---|---|---|
| CN | 106358155 A | 1/2017 |
| CN | 106487568 A | 3/2017 |
| EP | 2804417 A1 | 11/2014 |
| WO | 2012116007 A1 | 8/2012 |
| WO | 2016072052 A1 | 5/2016 |

* cited by examiner

METHOD FOR POSITIONING PICO REMOTE RADIO UNIT AND SYSTEM FOR POSITIONING PICO REMOTE RADIO UNIT

CROSS-REFERENCE TO RELATED APPLICATIONS

This application is a continuation of International Application No. PCT/CN2018/104575, filed on Sep. 7, 2018, which claims priority to Chinese Patent Application No. 201710923623.X, filed on Sep. 30, 2017. The disclosures of the aforementioned applications are hereby incorporated by reference in their entireties.

TECHNICAL FIELD

This application relates to the field of communications technologies, and in particular, to a method for positioning a pico remote radio unit and a system for positioning a pico remote radio unit.

BACKGROUND

With continuous enhancement of indoor digitalization and increasing requirements on indoor capacity, operators continuously enhance indoor deep coverage, and more pico remote radio units (PRRU) are applied indoors. For installation aesthetics, a home owner requires the PRRUs to be installed inside a suspended ceiling. After the installation is completed, in a routine maintenance phase, maintenance personnel cannot accurately find the PRRUs when the PRRUs are faulty. When installing the PRRUs based on a design drawing, construction personnel usually do not precisely mark actual installation positions due to skill and engineering delivery scope problems. There are numerous PRRUs. Therefore, even if the design drawing is available, a PRRU installed at an actual specific position cannot be known. Therefore, the maintenance personnel cannot find the PRRUs when needing to subsequently maintain the PRRUs.

In an existing method, during construction on the site, a wireless deployment tool (WDT) is used to scan an electronic serial number (ESN) of a PRRU and bind the ESN and a position. Specifically, an engineering design drawing is imported into the WDT. During construction, an engineering team or a supervisor scans an ESN of an installed PRRU based on an actual installation position of the PRRU, and manually binds the ESN and the position on the WDT. After installation of all PRRUs is completed, bound position information of the PRRUs is imported into a U2000 network management system for use.

However, the following problems exist when the ESN of the PRRU is scanned and is bound to the position of the PRRU during construction on the site: Different construction teams are responsible for different sites, and there may be a plurality of construction parties on a same site. Each site needs special training, and consequently, it is difficult to extend a contract scope. A plurality of engineering teams simultaneously perform construction, and if the collection is performed by the engineering teams, a contract scope problem is caused and costs need to be increased. An engineering team is low-skilled, and consequently, errors are easily introduced during the collection, and whether information is accurately collected cannot be checked. The WDT has a requirement on a terminal. However, existing terminals of the engineering teams are different, which increases the costs. If the scanning and binding are both performed by a supervisor, considering a bottleneck that one supervisor corresponds to a plurality of engineering teams, an engineering team may have already completed installation when the supervisor needs to perform scanning, so that the scanning cannot be performed. Consequently, it is still difficult to accurately obtain a position of a PRRU, and subsequent efficient operation and maintenance on the indoor system is affected.

SUMMARY

This application provides a method for positioning a pico remote radio unit and a system for positioning a pico remote radio unit. Drive test information on a terminal side and drive test information on a network management system side are recorded when a drive test is performed, and pico remote radio unit position information and a pico remote radio unit identifier are automatically associated and bound based on the drive test information on the terminal side and the drive test information on the network management system side, to facilitate positioning of a pico remote radio unit, and ensure efficient system operation and maintenance.

According to a first aspect of this application, a method for positioning a pico remote radio unit is provided, where the method is applied to a system for positioning a pico remote radio unit, the system for positioning a pico remote radio unit includes at least one pico remote radio unit, a drive test terminal, and a network management system server, and the method includes:

when the drive test terminal performs a drive test, obtaining, by the drive test terminal, drive test information that is on a terminal side and that is of a drive test event, where the drive test event occurs at least once;

obtaining, by the network management system server, drive test information that is on a network management system side and that is of the drive test event, where the drive test information on the network management system side includes a pico remote radio unit corresponding to the drive test event;

obtaining, by the network management system server, a pico remote radio unit identifier based on the measurement information on the network management system side; and obtaining, by the network management system server based on the measurement information on the network management system side and the drive test information on the terminal side, pico remote radio unit position information bound to the pico remote radio unit identifier.

When a user performs the drive test by using the drive test terminal, in a drive test process, the user performs a fixed point measurement at different positions when walking. Therefore, the drive test event occurs one after another. In addition, each time performing the drive test event, the drive test terminal temporarily accesses one pico remote radio unit. During the test or after the test is completed, the drive test terminal obtains the drive test information that is on the terminal side and that is of the drive test event at this time. The drive test event occurs not only once, but also may occur a plurality of times. Each time performing the drive test event, the drive test terminal temporarily accesses one pico remote radio unit, and the network management system server is connected to the pico remote radio unit, so that the network management system server may further obtain the drive test information that is on the network management system side and that corresponds to the drive test event, and the pico remote radio unit corresponding to the drive test event is also recorded in the drive test information on the network management system side. The obtained measurement information on the network management system side includes the pico remote radio unit corresponding to the drive test event. When already known the pico remote radio unit, the network management system server can obtain, by using a network, or preset the pico remote radio unit identifier corresponding to the pico remote radio unit. In each drive test event, the drive test terminal accesses one pico remote radio unit, so that the drive test terminal can automatically record, in the drive test information on the terminal side, a position of the pico remote radio unit to which the drive test event belongs, or record, in the drive test information on the terminal side, an indoor position of the drive test terminal. The pico remote radio unit position information can be obtained through calculation based on the measurement information on the network management system side and the drive test information on the terminal side that are of one drive test event, and positioning of the pico remote radio unit is implemented by binding the pico remote radio unit identifier and the pico remote radio unit position information. Compared with a solution in which during construction on the site, the pico remote radio unit identifier of the pico remote radio unit is scanned and is bound to the pico remote radio unit position information, this solution does not need a construction team to scan on the site. The scanning can be subsequently completed in the drive test process of the drive test terminal. The information is collected in an engineering standardized action, and automatic binding of the position is completed, to facilitate positioning of the pico remote radio unit. In addition, there are a plurality of pico remote radio units indoors, and some are installed inside a ceiling. An installation position of a faulty pico remote radio unit cannot be rapidly found. The pico remote radio unit position information and the pico remote radio unit identifier are automatically associated and bound based on the drive test information on the terminal side and the drive test information on the network management system side, to ensure efficient system operation and maintenance.

With reference to the first aspect of this application, in a first embodiment of the first aspect of this application, the measurement information on the terminal side includes a measurement event identifier and the pico remote radio unit position information, and the obtaining, by the drive test terminal, drive test information that is on a terminal side and that is of a drive test event includes:

obtaining, by the drive test terminal, pico remote radio unit layout information by using a pico remote radio unit design drawing;

obtaining, by the drive test terminal, the pico remote radio unit and the measurement event identifier of the drive test event;

determining, by the drive test terminal, the pico remote radio unit position information based on the pico remote radio unit and the pico remote radio unit layout information; and obtaining, by the drive test terminal, the measurement information on the terminal side based on the measurement event identifier and the pico remote radio unit position information.

In a construction phase, if an installation position of the pico remote radio unit has already been designed, the pico remote radio unit design drawing includes the pico remote radio unit layout information. When the drive test terminal performs the drive test process, in each drive test event, the drive test terminal temporarily accesses one pico remote radio unit, so that the drive test terminal can obtain the measurement event identifier and the pico remote radio unit at this time. The measurement event identifier includes a TMSI and a time stamp. Each time the drive test terminal accesses the pico remote radio unit, only one call is initiated. Therefore, each access generates one unique TMSI. The time stamp means a time in which the drive test terminal performs each drive test event. The TMSI and the time stamp can uniquely indicate one drive test event of the drive test terminal. In each drive test event, the drive test terminal knows the accessed pico remote radio unit. When already known the pico remote radio unit layout information, the drive test terminal can determine the pico remote radio unit position information of the pico remote radio unit in each drive test event. The drive test terminal combines the obtained pico remote radio unit position information and the measurement event identifier including the TMSI and the time stamp as the measurement information on the terminal side.

With reference to the first embodiment of the first aspect of this application, in a second embodiment of the first aspect of this application, the obtaining, by the network management system server, a pico remote radio unit identifier based on the measurement information on the network management system side includes:

obtaining, by the network management system server, the pico remote radio unit corresponding to the drive test event by parsing the measurement information on the network management system side; and obtaining, by the network management system server, the pico remote radio unit identifier of the pico remote radio unit based on preset pico remote radio unit configuration information and inventory information.

Each time performing the drive test event, the drive test terminal temporarily accesses one pico remote radio unit, and the network management system server is connected to the pico remote radio unit, so that the network management system server may further obtain the drive test information that is on the network management system side and that corresponds to the drive test event, the pico remote radio unit corresponding to the drive test event is recorded in the drive test information on the network management system side, and the TMSI and the time stamp that are of the drive test event are also recorded in the drive test information on the network management system side. The network management system server can obtain the pico remote radio unit corresponding to each drive test event by parsing the measurement information on the network management system side. The network management system server can learn of, based on the preset pico remote radio unit configuration information and inventory information, the pico remote radio unit identifier corresponding to each pico remote radio unit, and can obtain the pico remote radio unit identifier of the pico remote radio unit through matching.

With reference to the second embodiment of the first aspect of this application, in a third embodiment of the first aspect of this application, the drive test information on the network management system side further includes the measurement event identifier, and the obtaining, by the network management system server based on the measurement information on the network management system side and the drive test information on the terminal side, pico remote radio unit position information corresponding to the pico remote radio unit identifier includes:

associating, by the network management system server, the measurement information on the network management system side and the drive test information on the terminal side based on the measurement event identifier;

obtaining, by the network management system server, the pico remote radio unit position information by parsing the drive test information on the terminal side, and obtaining the pico remote radio unit identifier by parsing the measurement information on the network management system side; and binding, by the network management system server, the pico remote radio unit identifier and the pico remote radio unit position information based on a preset binding algorithm.

In each drive test event, the TMSI and the time stamp are recorded in both the measurement information on the network management system side and the drive test information on the terminal side, so that the measurement information on the network management system side and the drive test information on the terminal side are associated based on the TMSI and the time stamp. When already known that the drive test information on the terminal side includes the pico remote radio unit position information, the network management system server obtains the pico remote radio unit position information by parsing the drive test information on the terminal side. The network management system server binds the pico remote radio unit identifier and the pico remote radio unit position information by using the preset binding algorithm. Different preset binding algorithms need to be used based on different cases, and may specifically include the following three types: (1) a pico remote radio unit position adjacent relationship binding algorithm; (2) an iteration binding algorithm; and (3) a drive test adjacent relationship binding algorithm.

With reference to the first aspect of this application, in a fourth embodiment of the first aspect of this application, the measurement information on the terminal side includes a measurement event identifier and terminal position information, the drive test information on the network management system side further includes the measurement event identifier and a receive level of the pico remote radio unit; and the obtaining, by the network management system server based on the measurement information on the network management system side and the drive test information on the terminal side, pico remote radio unit position information bound to the pico remote radio unit identifier includes:

associating, by the network management system server, the measurement information on the network management system side and the drive test information on the terminal side based on the measurement event identifier;

obtaining, by the network management system server, the terminal position information by parsing the drive test information on the terminal side, and obtaining the receive level of the pico remote radio unit and the pico remote radio unit identifier by parsing the measurement information on the network management system side;

obtaining, by the network management system server, the pico remote radio unit position information through calculation by using a field strength positioning algorithm and based on the terminal position information and the receive level of the pico remote radio unit; and binding, by the network management system server, the pico remote radio unit identifier and the pico remote radio unit position information.

If the pico remote radio unit design drawing has been lost after the construction, when the drive test terminal performs the drive test process, in each drive test event, the drive test terminal temporarily accesses one pico remote radio unit, so that the drive test terminal can obtain the measurement event identifier and the pico remote radio unit at this time. The measurement event identifier includes the TMSI and the time stamp. Each time the drive test terminal accesses the pico remote radio unit, only one call is initiated. Therefore, each access generates one unique TMSI. The time stamp means a time in which the drive test terminal performs each drive test event. The TMSI and the time stamp can uniquely indicate one drive test event of the drive test terminal. Each time performing the drive test event, the drive test terminal temporarily accesses one pico remote radio unit, and the network management system server is connected to the pico remote radio unit, so that the network management system server may further obtain the drive test information that is on the network management system side and that corresponds to the drive test event, the pico remote radio unit corresponding to the drive test event is recorded in the drive test information on the network management system side, the TMSI and the time stamp that are of the drive test event are recorded in the drive test information on the network management system side, and a receive level of the pico remote radio unit corresponding to the drive test event when the pico remote radio unit receives a signal of the drive test terminal is also recorded in the drive test information on the network management system side. The network management system server associates the measurement information on the network management system side and the drive test information on the terminal side based on the measurement event identifier. The network management system server obtains the pico remote radio unit position information through calculation by using the field strength positioning algorithm and based on the terminal position information and the receive level of the pico remote radio unit, and binds the pico remote radio unit identifier and the pico remote radio unit position information. The pico remote radio unit position information calculated by using the positioning algorithm may have some errors. However, the errors can be smoothed and precision can be improved by controlling a quantity of sampling points and using the fixed point measurement. The pico remote radio unit position information is used for device maintenance, which is much better than no PRRU position information.

According to a second aspect of this application, a system for positioning a pico remote radio unit is provided, including:

at least one pico remote radio unit, a drive test terminal, and a network management system server, where the drive test terminal is configured to: when performing a drive test, obtain drive test information that is on a terminal side and that is of a drive test event, where the drive test event occurs at least once;

the network management system server is configured to obtain drive test information that is on a network management system side and that is of the drive test event, where the drive test information on the network management system side includes a pico remote radio unit corresponding to the drive test event;

the network management system server is further configured to obtain a pico remote radio unit identifier based on the measurement information on the network management system side; and the network management system server is further configured to obtain, based on the measurement information on the network management system side and the drive test information on the terminal side, pico remote radio unit position information bound to the pico remote radio unit identifier.

When a user performs the drive test by using the drive test terminal, in a drive test process, the user performs a fixed point measurement at different positions when walking.

Therefore, the drive test event occurs one after another. In addition, each time performing the drive test event, the drive test terminal temporarily accesses one pico remote radio unit. During the test or after the test is completed, the drive test terminal obtains the drive test information that is on the terminal side and that is of the drive test event at this time. The drive test event occurs not only once, but also may occur a plurality of times. Each time performing the drive test event, the drive test terminal temporarily accesses one pico remote radio unit, and the network management system server is connected to the pico remote radio unit, so that the network management system server may further obtain the drive test information that is on the network management system side and that corresponds to the drive test event, and the pico remote radio unit corresponding to the drive test event is also recorded in the drive test information on the network management system side. The obtained measurement information on the network management system side includes the pico remote radio unit corresponding to the drive test event. When already known the pico remote radio unit, the network management system server can obtain, by using a network, or preset the pico remote radio unit identifier corresponding to the pico remote radio unit. In each drive test event, the drive test terminal accesses one pico remote radio unit, so that the drive test terminal can automatically record, in the drive test information on the terminal side, a position of the pico remote radio unit to which the drive test event belongs, or record, in the drive test information on the terminal side, an indoor position of the drive test terminal. The pico remote radio unit position information can be obtained through calculation based on the measurement information on the network management system side and the drive test information on the terminal side that are of one drive test event, and positioning of the pico remote radio unit is implemented by binding the pico remote radio unit identifier and the pico remote radio unit position information. Compared with a solution in which during construction on the site, the pico remote radio unit identifier of the pico remote radio unit is scanned and is bound to the pico remote radio unit position information, this solution does not need a construction team to scan on the site. The scanning can be subsequently completed in the drive test process of the drive test terminal. The information is collected in an engineering standardized action, and automatic binding of the position is completed, to facilitate positioning of the pico remote radio unit. In addition, there are a plurality of pico remote radio units indoors, and some are installed inside a ceiling. An installation position of a faulty pico remote radio unit cannot be rapidly found. The pico remote radio unit position information and the pico remote radio unit identifier are automatically associated and bound based on the drive test information on the terminal side and the drive test information on the network management system side, to ensure efficient system operation and maintenance.

With reference to the second aspect of this application, in a first embodiment of the second aspect of this application, the measurement information on the terminal side includes a measurement event identifier and the pico remote radio unit position information, and the drive test terminal is specifically configured to obtain pico remote radio unit layout information by using a pico remote radio unit design drawing;

the drive test terminal is further configured to obtain the pico remote radio unit and the measurement event identifier of the drive test event;

the drive test terminal is further configured to determine the pico remote radio unit position information based on the pico remote radio unit and the pico remote radio unit layout information; and the drive test terminal is further configured to obtain the measurement information on the terminal side based on the measurement event identifier and the pico remote radio unit position information.

In a construction phase, if an installation position of the pico remote radio unit has already been designed, the pico remote radio unit design drawing includes the pico remote radio unit layout information. When the drive test terminal performs the drive test process, in each drive test event, the drive test terminal temporarily accesses one pico remote radio unit, so that the drive test terminal can obtain the measurement event identifier and the pico remote radio unit at this time. The measurement event identifier includes a TMSI and a time stamp. Each time the drive test terminal accesses the pico remote radio unit, only one call is initiated. Therefore, each access generates one unique TMSI. The time stamp means a time in which the drive test terminal performs each drive test event. The TMSI and the time stamp can uniquely indicate one drive test event of the drive test terminal. In each drive test event, the drive test terminal knows the accessed pico remote radio unit. When already known the pico remote radio unit layout information, the drive test terminal can determine the pico remote radio unit position information of the pico remote radio unit in each drive test event. The drive test terminal combines the obtained pico remote radio unit position information and the measurement event identifier including the TMSI and the time stamp as the measurement information on the terminal side.

With reference to the first embodiment of the second aspect of this application, in a second embodiment of the second aspect of this application, the network management system server is further configured to obtain the pico remote radio unit corresponding to the drive test event by parsing the measurement information on the network management system side; and the network management system server is further configured to obtain the pico remote radio unit identifier of the pico remote radio unit based on preset pico remote radio unit configuration information and inventory information.

Each time performing the drive test event, the drive test terminal temporarily accesses one pico remote radio unit, and the network management system server is connected to the pico remote radio unit, so that the network management system server may further obtain the drive test information that is on the network management system side and that corresponds to the drive test event, the pico remote radio unit corresponding to the drive test event is recorded in the drive test information on the network management system side, and the TMSI and the time stamp that are of the drive test event are also recorded in the drive test information on the network management system side. The network management system server can obtain the pico remote radio unit corresponding to each drive test event by parsing the measurement information on the network management system side. The network management system server can learn of, based on the preset pico remote radio unit configuration information and inventory information, the pico remote radio unit identifier corresponding to each pico remote radio unit, and can obtain the pico remote radio unit identifier of the pico remote radio unit through matching.

With reference to the second embodiment of the second aspect of this application, in a third embodiment of the second aspect of this application, the drive test information on the network management system side further includes the measurement event identifier, and the network management system server is further configured to associate the measurement information on the network management system side and the drive test information on the terminal side based on the measurement event identifier;

the network management system server is further configured to obtain the pico remote radio unit position information by parsing the drive test information on the terminal side, and obtain the pico remote radio unit identifier by parsing the measurement information on the network management system side; and the network management system server is further configured to bind the pico remote radio unit identifier and the pico remote radio unit position information based on a preset binding algorithm.

In each drive test event, the TMSI and the time stamp are recorded in both the measurement information on the network management system side and the drive test information on the terminal side, so that the measurement information on the network management system side and the drive test information on the terminal side are associated based on the TMSI and the time stamp. When already known that the drive test information on the terminal side includes the pico remote radio unit position information, the network management system server obtains the pico remote radio unit position information by parsing the drive test information on the terminal side. The network management system server binds the pico remote radio unit identifier and the pico remote radio unit position information by using the preset binding algorithm. Different preset binding algorithms need to be used based on different cases, and may specifically include the following three types: (1) a pico remote radio unit position adjacent relationship binding algorithm; (2) an iteration binding algorithm; and (3) a drive test adjacent relationship binding algorithm.

With reference to the second aspect of this application, in a fourth embodiment of the second aspect of this application, the measurement information on the terminal side includes a measurement event identifier and terminal position information, the drive test information on the network management system side further includes the measurement event identifier and a receive level of the pico remote radio unit; and that the network management system server is further configured to obtain, based on the measurement information on the network management system side and the drive test information on the terminal side, pico remote radio unit position information bound to the pico remote radio unit identifier includes:

the network management system server is further configured to associate the measurement information on the network management system side and the drive test information on the terminal side based on the measurement event identifier;

the network management system server is further configured to obtain the terminal position information by parsing the drive test information on the terminal side, and obtain the receive level of the pico remote radio unit and the pico remote radio unit identifier by parsing the measurement information on the network management system side;

the network management system server is further configured to obtain the pico remote radio unit position information through calculation by using a field strength positioning algorithm and based on the terminal position information and the receive level of the pico remote radio unit; and the network management system server is further configured to bind the pico remote radio unit identifier and the pico remote radio unit position information.

If the pico remote radio unit design drawing has been lost after the construction, when the drive test terminal performs the drive test process, in each drive test event, the drive test terminal temporarily accesses one pico remote radio unit, so that the drive test terminal can obtain the measurement event identifier and the pico remote radio unit at this time. The measurement event identifier includes the TMSI and the time stamp. Each time the drive test terminal accesses the pico remote radio unit, only one call is initiated. Therefore, each access generates one unique TMSI. The time stamp means a time in which the drive test terminal performs each drive test event. The TMSI and the time stamp can uniquely indicate one drive test event of the drive test terminal. Each time performing the drive test event, the drive test terminal temporarily accesses one pico remote radio unit, and the network management system server is connected to the pico remote radio unit, so that the network management system server may further obtain the drive test information that is on the network management system side and that corresponds to the drive test event, the pico remote radio unit corresponding to the drive test event is recorded in the drive test information on the network management system side, the TMSI and the time stamp that are of the drive test event are recorded in the drive test information on the network management system side, and a receive level of the pico remote radio unit corresponding to the drive test event when the pico remote radio unit receives a signal of the drive test terminal is also recorded in the drive test information on the network management system side. The network management system server associates the measurement information on the network management system side and the drive test information on the terminal side based on the measurement event identifier. The network management system server obtains the pico remote radio unit position information through calculation by using the field strength positioning algorithm and based on the terminal position information and the receive level of the pico remote radio unit, and binds the pico remote radio unit identifier and the pico remote radio unit position information. The pico remote radio unit position information calculated by using the positioning algorithm may have some errors. However, the errors can be smoothed and precision can be improved by controlling a quantity of sampling points and using the fixed point measurement. The pico remote radio unit position information is used for device maintenance, which is much better than no pico remote radio unit position information.

According to a third aspect of this application, a computer-readable storage medium is provided, including an instruction, where when the instruction is run on a computer, the computer is enabled to perform the foregoing method for positioning a pico remote radio unit.

According to a fourth aspect of this application, a computer program product including an instruction is provided, where when the computer program product is run on a computer, the computer is enabled to perform the foregoing method for positioning a pico remote radio unit.

BRIEF DESCRIPTION OF DRAWINGS

To describe technical solutions in embodiments of this application more clearly, the following briefly describes the accompanying drawings required for describing the embodiments and the prior art. Apparently, the accompanying drawings in the following description show merely some embodiments of this application, and persons of ordinary skill in the art may still derive other drawings from these accompanying drawings without creative efforts.

DESCRIPTION OF EMBODIMENTS

This application provides a method for positioning a pico remote radio unit and a system for positioning a pico remote radio unit. Drive test information on a terminal side and drive test information on a network management system side are recorded when a drive test is performed, and pico remote radio unit position information and a pico remote radio unit identifier are automatically associated and bound based on the drive test information on the terminal side and the drive test information on the network management system side, to facilitate positioning of a pico remote radio unit, and ensure efficient system operation and maintenance.

The following clearly and completely describes technical solutions in this application with reference to the accompanying drawings in this application. Apparently, the described embodiments are merely some rather than all of embodiments of this application. All other embodiments obtained by persons skilled in the art based on the embodiments of this application without creative efforts shall fall within the protection scope of this application.

First, a system architecture or a scenario to which this application is applied is briefly described.

Figure 1:
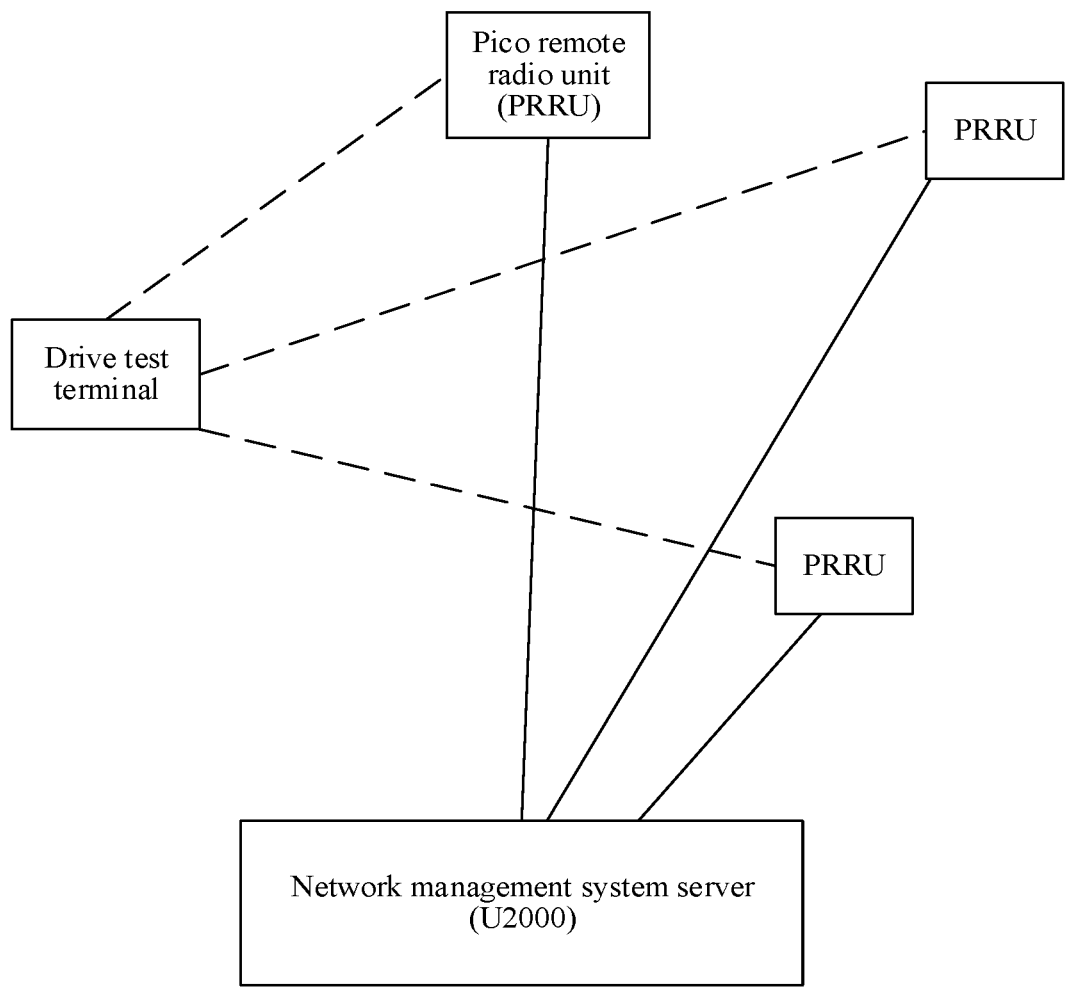
FIG. 1 is a schematic structural diagram of a system architecture or a scenario according to this application.

FIG. 1 is a schematic diagram of a system architecture or a scenario in this application. A drive test terminal is an electronic device with a communication function, and may be specifically a mobile phone or the like. In a drive test process, the drive test terminal may be connected to a network management system server by using one of a plurality of PRRUs indoors. When performing a drive test by using the drive test terminal, a user can move and perform a fixed point measurement at different positions. Each measurement is referred to as one drive test event.

Figure 2:
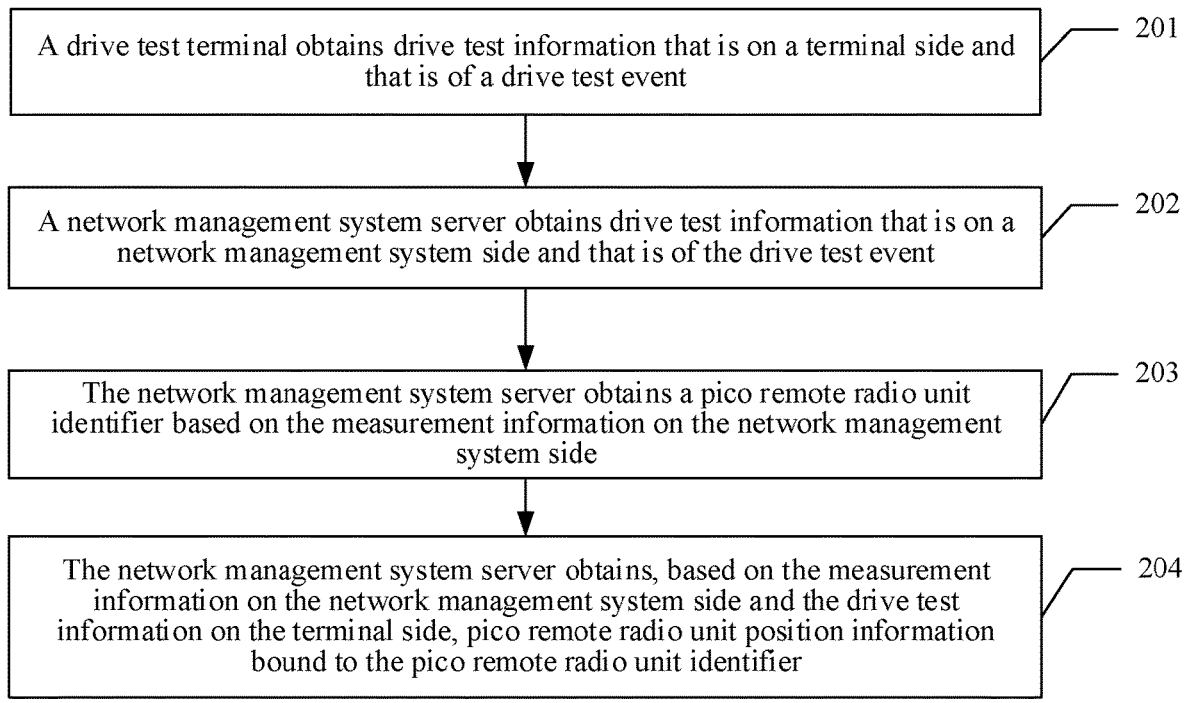
FIG. 2 is a schematic flowchart of an embodiment of a method for positioning a pico remote radio unit according to this application.

With reference to FIG. 2, based on the foregoing descriptions, an embodiment of this application provides a method for positioning a pico remote radio unit, including the following steps.

201. The drive test terminal obtains drive test information that is on a terminal side and that is of the drive test event.

In this embodiment, when a user performs the drive test by using the drive test terminal, in the drive test process, the user performs a fixed point measurement at different positions when walking. Therefore, the drive test event occurs one after another. In addition, each time performing the drive test event, the drive test terminal temporarily accesses one pico remote radio unit (PRRU). During the test or after the test is completed, the drive test terminal obtains the drive test information that is on the terminal side and that is of the drive test event at this time. The drive test event occurs not only once, but also may occur a plurality of times.

202. The network management system server obtains drive test information that is on a network management system side and that is of the drive test event.

In this embodiment, each time performing the drive test event, the drive test terminal temporarily accesses one PRRU, and the network management system server is connected to the PRRU, so that the network management system server may further obtain the drive test information that is on the network management system side and that corresponds to the drive test event, and the PRRU corresponding to the drive test event is also recorded in the drive test information on the network management system side.

203. The network management system server obtains a pico remote radio unit identifier based on the measurement information on the network management system side.

In this embodiment, the obtained measurement information on the network management system side includes the PRRU corresponding to the drive test event. When already known the PRRU, the network management system server can obtain, by using a network, or preset the pico remote radio unit identifier corresponding to the PRRU. The pico remote radio unit identifier may be specifically an equipment serial number (ESN), and the ESN is used as a unique identifier of the PRRU.

204. The network management system server obtains, based on the measurement information on the network management system side and the drive test information on the terminal side, pico remote radio unit position information bound to the pico remote radio unit identifier.

In this embodiment, in each drive test event, the drive test terminal accesses one PRRU, so that when already known PRRU layout information during construction of the PRRU, the drive test terminal can automatically record, in the drive test information on the terminal side, a position of the PRRU to which the drive test event belongs, or record, in the drive test information on the terminal side, an indoor position of the drive test terminal. The PRRU position information can be obtained through calculation based on the measurement information on the network management system side and the drive test information on the terminal side that are of one drive test event, and positioning of the PRRU is implemented by binding the ESN and the PRRU position information. Certainly, a PRRU already positioned does not need to be positioned again.

In this embodiment of this application, compared with a solution in which during construction on the site, the ESN of the PRRU is scanned and is bound to the position of the PRRU, this solution does not need a construction team to scan on the site. The scanning can be subsequently completed in the drive test process of the drive test terminal. The information is collected in an engineering standardized action, and automatic binding of the position is completed, to facilitate positioning of the PRRU. In addition, there are a plurality of PRRUs indoors, and some are installed inside a ceiling. An installation position of a faulty PRRU cannot be rapidly found. The PRRU position information and the PRRU identifier are automatically associated and bound based on the drive test information on the terminal side and the drive test information on the network management system side, to ensure efficient system operation and maintenance.

In the foregoing embodiment, the PRRU position information may already be determined based on a PRRU design drawing during the construction, or a situation of the PRRU position information may be unknown. In this case, positioning of a specific PRRU can be implemented in the following two manners. Descriptions are shown in detail in the following by using embodiments.

Figure 3:
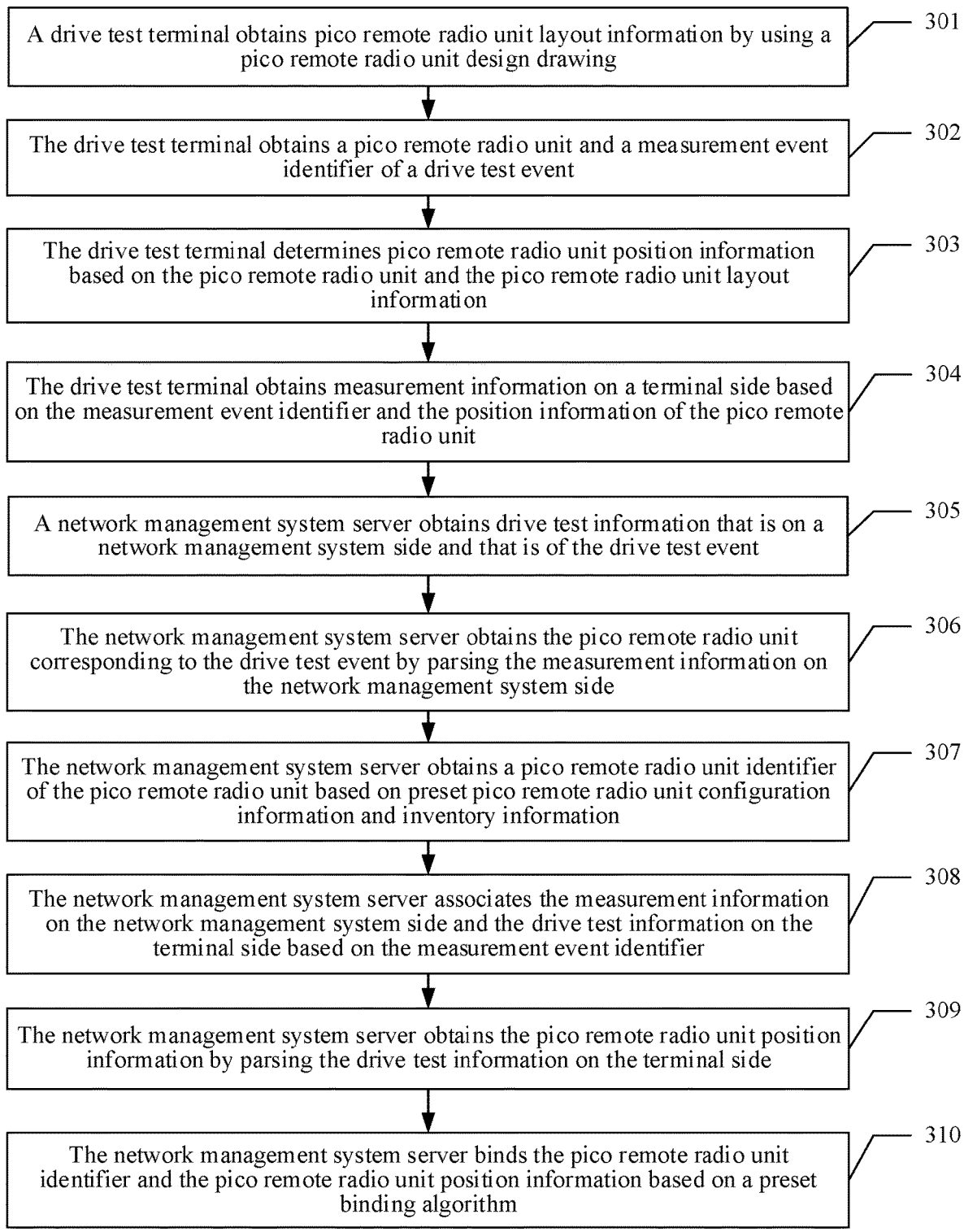
FIG. 3 is a schematic flowchart of another embodiment of the method for positioning a pico remote radio unit according to this application.

With reference to FIG. 3, an embodiment of this application provides a method for positioning a pico remote radio unit, including the following steps.

301. The drive test terminal obtains pico remote radio unit layout information by using a pico remote radio unit design drawing.

In this embodiment, in a construction phase, if an installation position of the PRRU has already been designed, the PRRU design drawing includes the PRRU layout information.

302. The drive test terminal obtains the pico remote radio unit and a measurement event identifier of the drive test event.

In this embodiment, when the drive test terminal performs the drive test process, in each drive test event, the drive test terminal temporarily accesses one PRRU, so that the drive test terminal can obtain the measurement event identifier and the PRRU at this time. The measurement event identifier includes a temporary mobile subscriber identity (TMSI) and a time stamp. Each time the drive test terminal accesses the PRRU, only one call is initiated. Therefore, each access generates one unique TMSI. The time stamp means a time in which the drive test terminal performs each drive test event. The TMSI and the time stamp can uniquely indicate one drive test event of the drive test terminal.

303. The drive test terminal determines the pico remote radio unit position information based on the pico remote radio unit and the pico remote radio unit layout information.

In this embodiment, in each drive test event, the drive test terminal knows the accessed PRRU. When already known the PRRU layout information, the drive test terminal can determine the PRRU position information of the PRRU in each drive test event.

304. The drive test terminal obtains the measurement information on the terminal side based on the measurement event identifier and the pico remote radio unit position information.

In this embodiment, the drive test terminal combines the obtained PRRU position information and the measurement event identifier including the TMSI and the time stamp as the measurement information on the terminal side.

305. The network management system server obtains the drive test information that is on the network management system side and that is of the drive test event.

In this embodiment, each time performing the drive test event, the drive test terminal temporarily accesses one PRRU, and the network management system server is connected to the PRRU, so that the network management system server may further obtain the drive test information that is on the network management system side and that corresponds to the drive test event, the PRRU corresponding to the drive test event is recorded in the drive test information on the network management system side, and the TMSI and the time stamp that are of the drive test event are also recorded in the drive test information on the network management system side.

306. The network management system server obtains the pico remote radio unit corresponding to the drive test event by parsing the measurement information on the network management system side.

In this embodiment, the network management system server can obtain the PRRU corresponding to each drive test event by parsing the measurement information on the network management system side.

307. The network management system server obtains the pico remote radio unit identifier of the pico remote radio unit based on preset pico remote radio unit configuration information and inventory information.

In this embodiment, the network management system server can learn of, based on the preset PRRU configuration information and inventory information, the ESN corresponding to each PRRU, and can obtain the ESN of the PRRU through matching.

308. The network management system server associates the measurement information on the network management system side and the drive test information on the terminal side based on the measurement event identifier.

In this embodiment, in each drive test event, the TMSI and the time stamp are recorded in both the measurement information on the network management system side and the drive test information on the terminal side, so that the measurement information on the network management system side and the drive test information on the terminal side are associated based on the TMSI and the time stamp.

309. The network management system server obtains the pico remote radio unit position information by parsing the drive test information on the terminal side.

In this embodiment, when already known that the drive test information on the terminal side includes the PRRU position information, the network management system server obtains the PRRU position information by parsing the drive test information on the terminal side.

310. The network management system server binds the pico remote radio unit identifier and the pico remote radio unit position information based on a preset binding algorithm.

Figure 4:
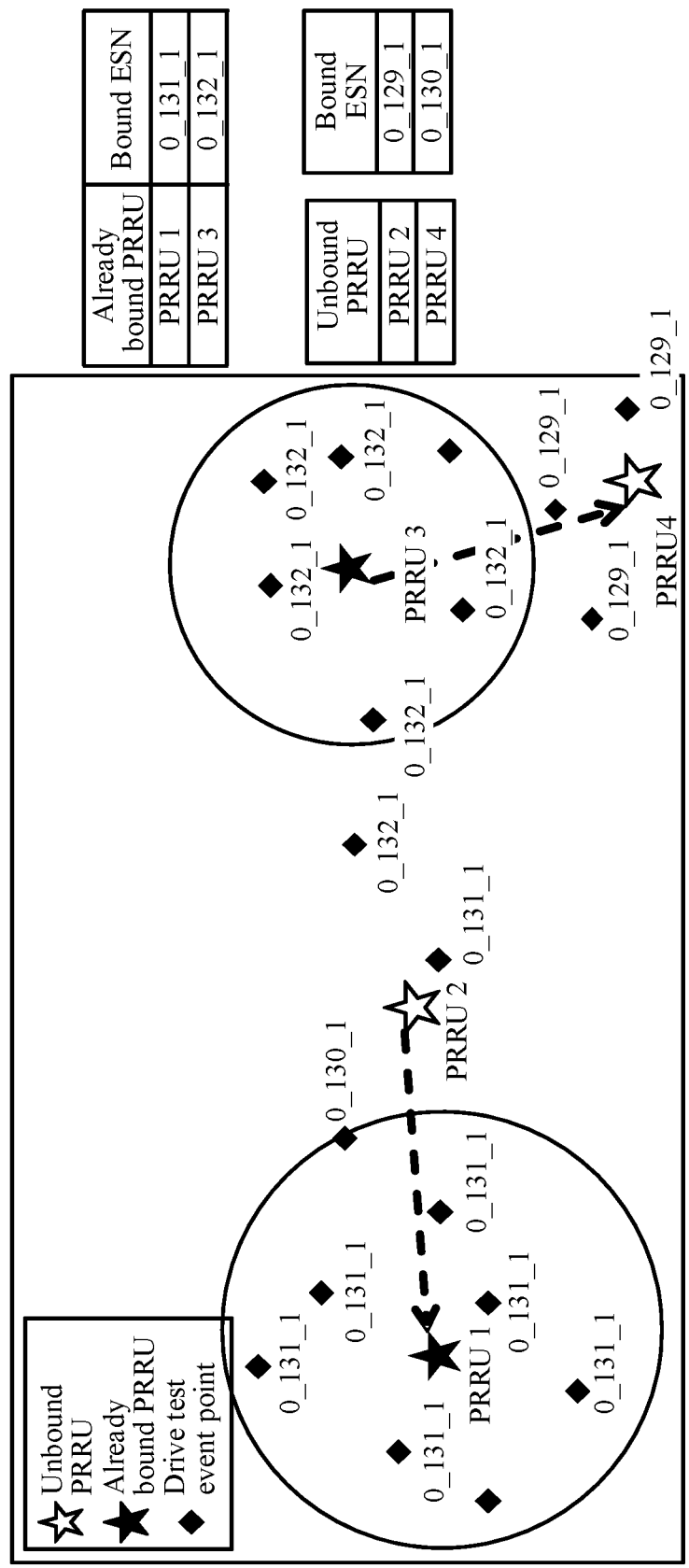
FIG. 4 is a schematic diagram of a PRRU position adjacent relationship binding algorithm according to this application.

In this embodiment, the network management system server binds the pico remote radio unit identifier and the pico remote radio unit position information by using the preset binding algorithm. Different preset binding algorithms need to be used based on different cases, and may specifically include the following three types: (1) a PRRU position adjacent relationship binding algorithm; (2) an iteration binding algorithm; and (3) a drive test adjacent relationship binding algorithm. Descriptions are provided in the following:

(1) Drive test data of the pico remote radio unit may be lost due to a problem in a drive test line (for example, because a user cannot walk indoors). When a quantity of drive test events is not sufficient and cannot reach a specific threshold, position information of some PRRUs fails to be bound to ESNs. In this case, the PRRU position adjacent relationship binding algorithm can be used. As shown in FIG. 4, an iteration is sequentially performed on unbound ESNs, an ESN, adjacent to the unbound ESN, in an already bound ESN set (in FIG. 4, 0_129_1 is adjacent to 0_132_1 are, and 0_130_1, is adjacent to 0_131_1) is obtained based on a signal strength relationship, and the unbound ESN is bound to an unbound PRRU position based on an already bound PRRU position and a position of the drive test event.

Figure 5:
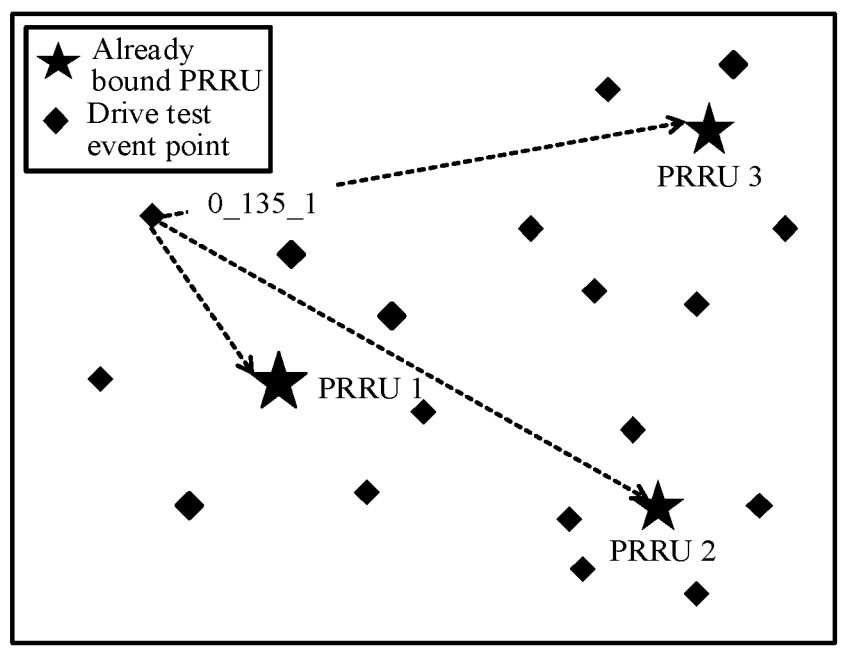
FIG. 5 is a schematic diagram of an iteration binding algorithm according to this application.
Figure 6:
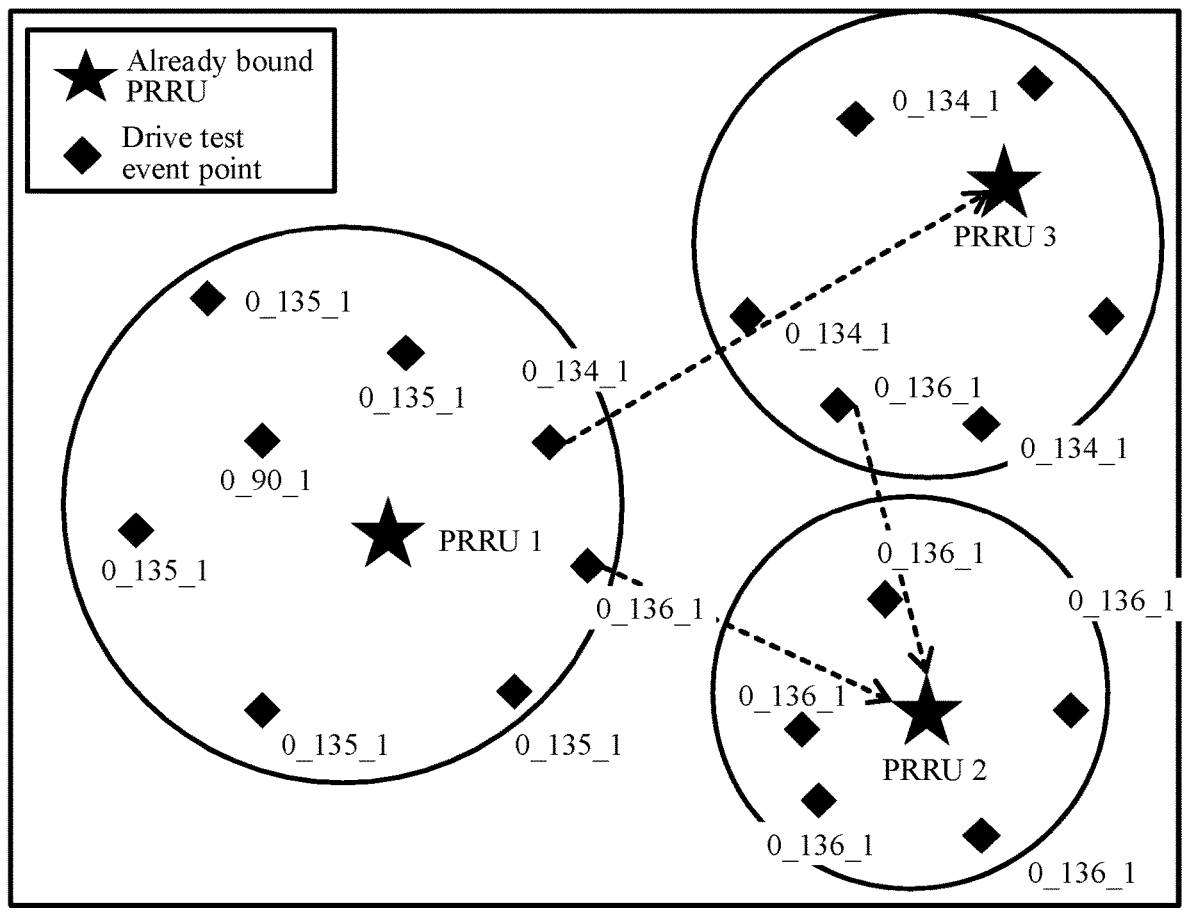
FIG. 6 is another schematic diagram of the iteration binding algorithm according to this application.

(2) A PRRU signal fluctuates greatly and is easily affected by floors (when an upper floor and a lower floor are in a same cell). Therefore, drive test event points around the position of the PRRU are inconsistent with actual ESNs. As shown in FIG. 6, a PRRU 1 is interfered by 0_134_1, 0_136_1, and 0_90_1 (cross-floor ESNs); and a PRRU 3 is interfered by 0_136_1. Therefore, impact of an interfering drive test event point may be eliminated by using an inter-floor iteration binding algorithm or a cross-floor iteration binding algorithm. As shown in FIG. 5, first, one drive test event point is used to calculate a Euclidean distance with all PRRU positions, and all drive test event points are calculated in a same manner one by one. FIG. 6 shows a result of iteration binding: To meet two thresholds: one is that a quantity of successful binding times is five, the other is that a correct binding rate is 80%, a sequence of the iteration binding is a PRRU 2, a PRRU 1, and a PRRU 3.

Figure 7:
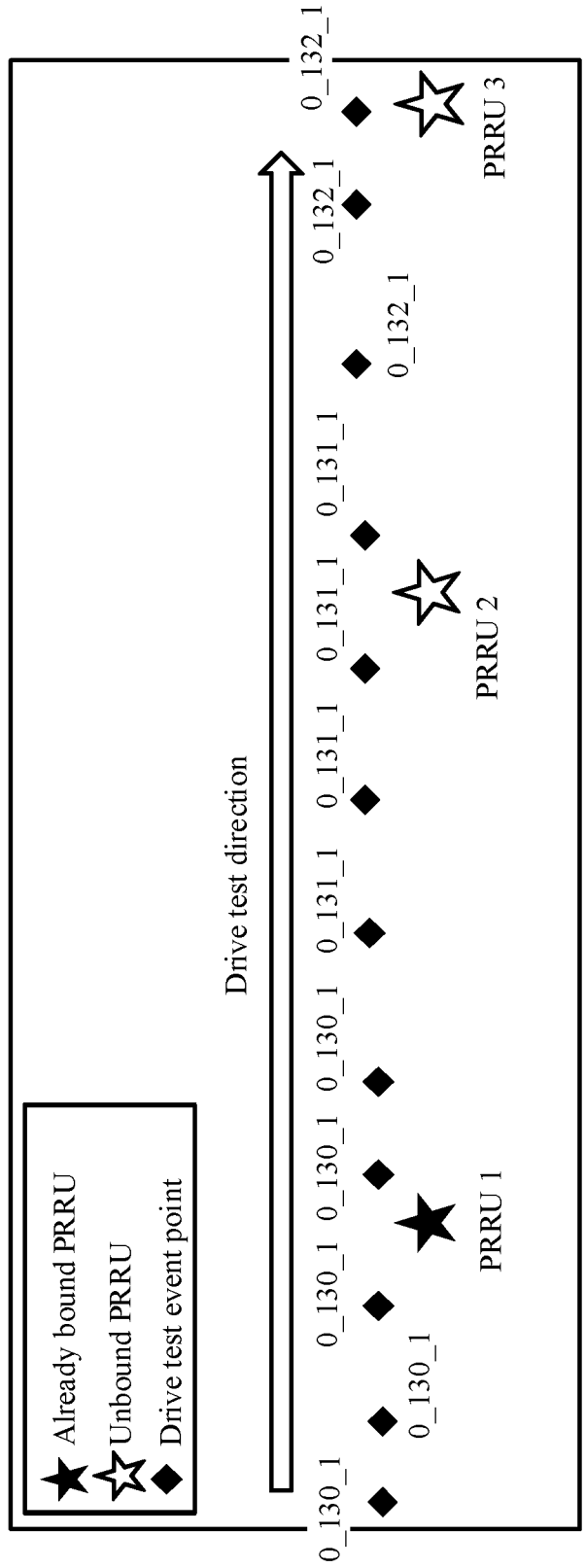
FIG. 7 is a schematic diagram of a drive test adjacent relationship binding algorithm according to this application.

(3) If PRRUs are excessively close to each other, and when a PRRU signal is blocked by drive test personnel, drive test event points with a same ESN around a PRRU point position tend to be located on one side, and a quantity of drive test event points are relatively small. As shown in FIG. 7, drive test point position data of 0_131_1 and 0_132_1 are respectively on left sides of a PRRU 2 and a PRRU 3. In this case, impact of an interfering drive test event point may be eliminated by using the drive test adjacent relationship binding algorithm, and an unbound PRRU position and an occurrence order of ESNs (which are 0_130_1, 0_131_1, and 0_132_1 in FIG. 7) are determined based on a sequence of drive test events, to sequentially bind the PRRU 2 and the PRRU 3 with their corresponding ESNs.

Figure 8:
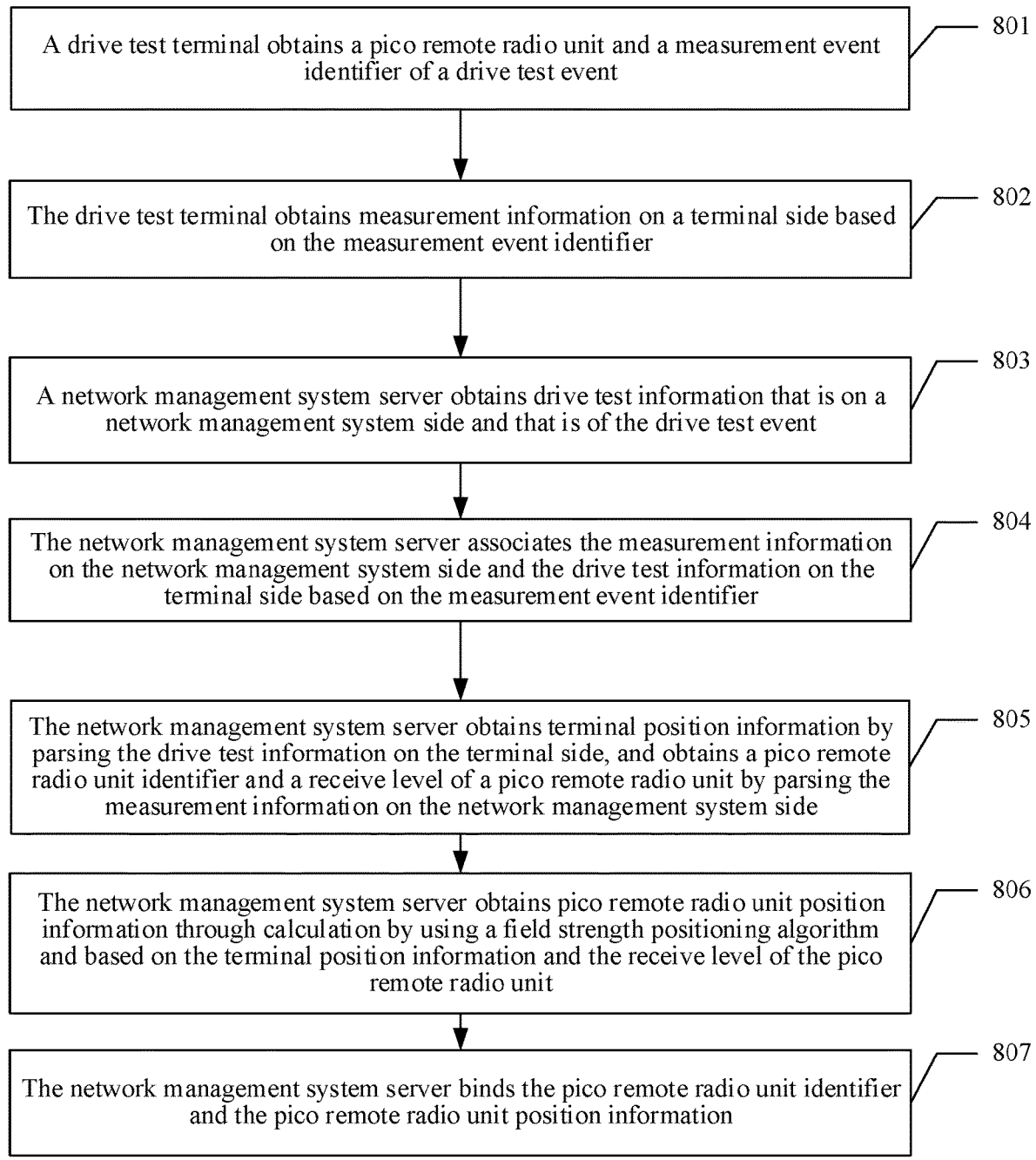
FIG. 8 is a schematic flowchart of still another embodiment of the method for positioning a pico remote radio unit according to this application.

With reference to FIG. 8, an embodiment of this application provides a method for positioning a pico remote radio unit, including the following steps.

801. The drive test terminal obtains the pico remote radio unit and a measurement event identifier of the drive test event.

In this embodiment, if the PRRU design drawing has been lost after the construction, when the drive test terminal performs the drive test process, in each drive test event, the drive test terminal temporarily accesses one PRRU, so that the drive test terminal can obtain the measurement event identifier and the PRRU at this time. The measurement event identifier includes a TMSI and a time stamp. Each time the drive test terminal accesses the PRRU, only one call is initiated. Therefore, each access generates one unique TMSI. The time stamp means a time in which the drive test terminal performs each drive test event. The TMSI and the time stamp can uniquely indicate one drive test event of the drive test terminal.

802. The drive test terminal obtains the measurement information on the terminal side based on the measurement event identifier.

In this embodiment, the drive test terminal combines the obtained PRRU position information and the measurement event identifier including the TMSI and the time stamp as the measurement information on the terminal side.

803. The network management system server obtains the drive test information that is on the network management system side and that is of the drive test event.

In this embodiment, each time performing the drive test event, the drive test terminal temporarily accesses one PRRU, and the network management system server is connected to the PRRU, so that the network management system server may further obtain the drive test information that is on the network management system side and that corresponds to the drive test event, the PRRU corresponding to the drive test event is recorded in the drive test information on the network management system side, the TMSI and the time stamp that are of the drive test event are recorded in the drive test information on the network management system side, and a receive level of the PRRU corresponding to the drive test event when the PRRU receives a signal of the drive test terminal is also recorded in the drive test information on the network management system side.

804. The network management system server associates the measurement information on the network management system side and the drive test information on the terminal side based on the measurement event identifier.

In this embodiment, in each drive test event, the TMSI and the time stamp are recorded in both the measurement information on the network management system side and the drive test information on the terminal side, so that the measurement information on the network management system side and the drive test information on the terminal side are associated based on the TMSI and the time stamp.

805. The network management system server obtains terminal position information by parsing the drive test information on the terminal side, and obtains the receive level of the pico remote radio unit and the pico remote radio unit identifier by parsing the measurement information on the network management system side.

In this embodiment, the network management system server obtains the terminal position information by parsing the drive test information on the terminal side, and obtains the receive level of the PRRU and the ESN by parsing the measurement information on the network management system side.

806. The network management system server obtains the pico remote radio unit position information through calculation by using a field strength positioning algorithm and based on the terminal position information and the receive level of the pico remote radio unit.

In this embodiment, the network management system server obtains the PRRU position information, through calculation by using a field strength positioning algorithm and based on the terminal position information and the receive level of the pico remote radio unit.

807. The network management system server binds the pico remote radio unit identifier and the pico remote radio unit position information.

In this embodiment, the network management system server binds the pico remote radio unit identifier and the pico remote radio unit position information.

In this embodiment of this application, the PRRU position information calculated by using the positioning algorithm may have some errors. However, the errors can be smoothed and precision can be improved by controlling a quantity of sampling points and using the fixed point measurement. The PRRU position information is used for device maintenance, which is much better than no PRRU position information.

Figure 9:
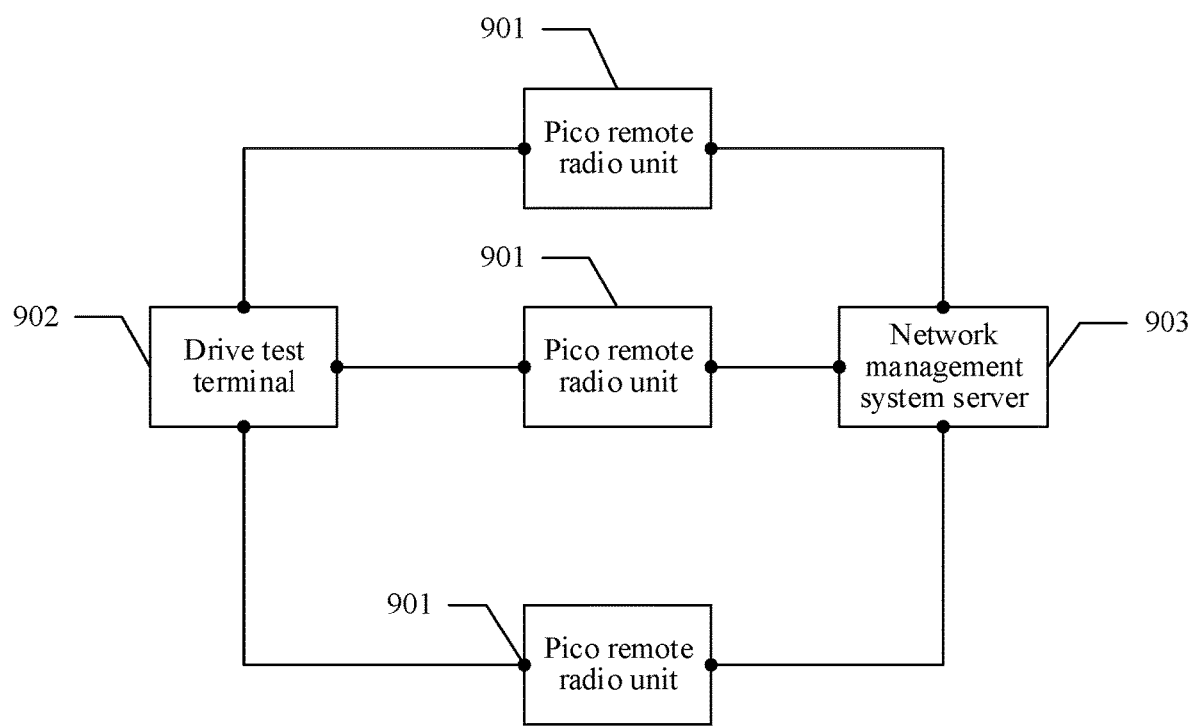
FIG. 9 is a schematic structural diagram of an embodiment of a system for positioning a pico remote radio unit according to this application.

With reference to FIG. 9, an embodiment of this application provides a system for positioning a pico remote radio unit, including the following steps.

at least one pico remote radio unit 901, a drive test terminal 902, and a network management system server 903, where the drive test terminal 902 is configured to: when performing a drive test, obtain drive test information that is on a terminal side and that is of a drive test event, where the drive test event occurs at least once;

the network management system server 903 is configured to obtain drive test information that is on a network management system side and that is of the drive test event, where the drive test information on the network management system side includes a pico remote radio unit 901 corresponding to the drive test event;

the network management system server 903 is further configured to obtain a pico remote radio unit identifier based on the measurement information on the network management system side; and the network management system server 903 is further configured to obtain, based on the measurement information on the network management system side and the drive test information on the terminal side, pico remote radio unit position information bound to the pico remote radio unit identifier.

In this embodiment of this application, when a user performs the drive test by using the drive test terminal 902, in a drive test process, the user performs a fixed point measurement at different positions when walking. Therefore, the drive test event occurs one after another. In addition, each time performing the drive test event, the drive test terminal 902 temporarily accesses one pico remote radio unit 901. During the test or after the test is completed, the drive test terminal 902 obtains the drive test information that is on the terminal side and that is of the drive test event at this time. The drive test event occurs not only once, but also may occur a plurality of times. Each time performing the drive test event, the drive test terminal 902 temporarily accesses one pico remote radio unit 901, and the network management system server 903 is connected to the pico remote radio unit 901, so that the network management system server 903 may further obtain the drive test information that is on the network management system side and that corresponds to the drive test event, and the pico remote radio unit 901 corresponding to the drive test event is also recorded in the drive test information on the network management system side. The obtained measurement information on the network management system side includes the pico remote radio unit 901 corresponding to the drive test event. When already known the pico remote radio unit 901, the network management system server 903 can obtain, by using a network, or preset the pico remote radio unit identifier corresponding to the pico remote radio unit 901. In each drive test event, the drive test terminal 902 accesses one pico remote radio unit 901, so that the drive test terminal 902 can automatically record, in the drive test information on the terminal side, a position of the pico remote radio unit 901 to which the drive test event belongs, or record, in the drive test information on the terminal side, an indoor position of the drive test terminal 902. The pico remote radio unit position information can be obtained through calculation based on the measurement information on the network management system side and the drive test information on the terminal side that are of one drive test event, and positioning of the pico remote radio unit is implemented by binding the pico remote radio unit identifier and the pico remote radio unit position information. Compared with a solution in which during construction on the site, the pico remote radio unit identifier of the pico remote radio unit is scanned and is bound to the pico remote radio unit position information, this solution does not need a construction team to scan on the site. The scanning can be subsequently completed in the drive test process of the drive test terminal 902. The information is collected in an engineering standardized action, and automatic binding of the position is completed, to facilitate positioning of the pico remote radio unit. In addition, there are a plurality of pico remote radio units indoors, and some are installed inside a ceiling. An installation position of a faulty pico remote radio unit cannot be rapidly found. The pico remote radio unit position information and the pico remote radio unit identifier are automatically associated and bound based on the drive test information on the terminal side and the drive test information on the network management system side, to ensure efficient system operation and maintenance.

Optionally, in some embodiments of this application, the measurement information on the terminal side includes a measurement event identifier and the pico remote radio unit position information, and the drive test terminal 902 is specifically configured to obtain pico remote radio unit layout information by using a pico remote radio unit design drawing;

the drive test terminal 902 is further configured to obtain the pico remote radio unit 901 and the measurement event identifier of the drive test event;

the drive test terminal 902 is further configured to determine the pico remote radio unit position information based on the pico remote radio unit 901 and the pico remote radio unit layout information; and the drive test terminal 902 is further configured to obtain the measurement information on the terminal side based on the measurement event identifier and the pico remote radio unit position information.

In this embodiment of this application, in a construction phase, if an installation position of the pico remote radio unit 901 has already been designed, the pico remote radio unit design drawing includes the pico remote radio unit layout information. When the drive test terminal 902 performs the drive test process, in each drive test event, the drive test terminal 902 temporarily accesses one pico remote radio unit 901, so that the drive test terminal can obtain the measurement event identifier and the pico remote radio unit 901 at this time. The measurement event identifier includes a TMSI and a time stamp. Each time the drive test terminal 902 accesses the pico remote radio unit 901, the drive test terminal only one call is initiated. Therefore, each access generates one unique TMSI. The time stamp means a time in which the drive test terminal 902 performs each drive test event. The TMSI and the time stamp can uniquely indicate one drive test event of the drive test terminal 902. In each drive test event, the drive test terminal 902 knows the accessed pico remote radio unit 901. When already known the pico remote radio unit layout information, the drive test terminal can determine the pico remote radio unit position information of the pico remote radio unit 901 in each drive test event. The drive test terminal 902 combines the obtained pico remote radio unit position information and the measurement event identifier including the TMSI and the time stamp as the measurement information on the terminal side.

Optionally, in some embodiments of this application, the network management system server 903 is further configured to obtain the pico remote radio unit 901 corresponding to the drive test event by parsing the measurement information on the network management system side; and the network management system server 903 is further configured to obtain the pico remote radio unit identifier of the pico remote radio unit 901 based on preset pico remote radio unit configuration information and inventory information.

In this embodiment of this application, each time performing the drive test event, the drive test terminal 902 temporarily accesses one pico remote radio unit 901, and the network management system server 903 is connected to the pico remote radio unit 901, so that the network management system server 903 may further obtain the drive test information that is on the network management system side and that corresponds to the drive test event, the pico remote radio unit 901 corresponding to the drive test event is recorded in the drive test information on the network management system side, and the TMSI and the time stamp that are of the drive test event are also recorded in the drive test information on the network management system side. The network management system server 903 can obtain the pico remote radio unit 901 corresponding to each drive test event by parsing the measurement information on the network management system side. The network management system server 903 can learn of, based on the preset pico remote radio unit configuration information and inventory information, the pico remote radio unit identifier corresponding to each pico remote radio unit 901, and can obtain the pico remote radio unit identifier of the pico remote radio unit 901 through matching.

Optionally, in some embodiments of this application, the drive test information on the network management system side further includes a measurement event identifier, and the network management system server 903 is further configured to associate the measurement information on the network management system side and the drive test information on the terminal side based on the measurement event identifier;

the network management system server 903 is further configured to obtain the pico remote radio unit position information by parsing the drive test information on the terminal side, and obtain the pico remote radio unit identifier by parsing the measurement information on the network management system side; and the network management system server 903 is further configured to bind the pico remote radio unit identifier and the pico remote radio unit position information based on a preset binding algorithm.

In this embodiment of this application, in each drive test event, the TMSI and the time stamp are recorded in both the measurement information on the network management system side and the drive test information on the terminal side, so that the measurement information on the network management system side and the drive test information on the terminal side are associated based on the TMSI and the time stamp. When already known that the drive test information on the terminal side includes the pico remote radio unit position information, the network management system server 903 obtains the pico remote radio unit position information by parsing the drive test information on the terminal side. The network management system server 903 binds the pico remote radio unit identifier and the pico remote radio unit position information by using the preset binding algorithm. Different preset binding algorithms need to be used based on different cases, and may specifically include the following three types: (1) a pico remote radio unit position adjacent relationship binding algorithm; (2) an iteration binding algorithm; and (3) a drive test adjacent relationship binding algorithm.

Optionally, in some embodiments of this application, the measurement information on the terminal side includes a measurement event identifier and terminal position information, the drive test information on the network management system side further includes the measurement event identifier and a receive level of the pico remote radio unit 901; and that the network management system server 903 is further configured to obtain, based on the measurement information on the network management system side and the drive test information on the terminal side, pico remote radio unit position information bound to the pico remote radio unit identifier includes:

the network management system server 903 is further configured to associate the measurement information on the network management system side and the drive test information on the terminal side based on the measurement event identifier;

the network management system server 903 is further configured to obtain the terminal position information by parsing the drive test information on the terminal side, and obtain the receive level of the pico remote radio unit and the pico remote radio unit identifier 901 by parsing the measurement information on the network management system side;

the network management system server 903 is further configured to obtain the pico remote radio unit position information through calculation by using a field strength positioning algorithm and based on the terminal position information and the receive level of the pico remote radio unit 901; and the network management system server 903 is further configured to bind the pico remote radio unit identifier and the pico remote radio unit position information.

In this embodiment of this application, if the pico remote radio unit design drawing has been lost after the construction, when the drive test terminal 902 performs the drive test process, in each drive test event, the drive test terminal 902 temporarily accesses one pico remote radio unit 901, so that the drive test terminal can obtain the measurement event identifier and the pico remote radio unit 901 at this time. The measurement event identifier includes the TMSI and the time stamp. Each time the drive test terminal 902 accesses the pico remote radio unit 901, only one call is initiated. Therefore, each access generates one unique TMSI. The time stamp means a time in which the drive test terminal 902 performs each drive test event. The TMSI and the time stamp can uniquely indicate one drive test event of the drive test terminal 902. Each time performing the drive test event, the drive test terminal 902 temporarily accesses one pico remote radio unit 901, and the network management system server 903 is connected to the pico remote radio unit 901, so that the network management system server 903 may further obtain the drive test information that is on the network management system side and that corresponds to the drive test event, the pico remote radio unit 901 corresponding to the drive test event is recorded in the drive test information on the network management system side, the TMSI and the time stamp that are of the drive test event are recorded in the drive test information on the network management system side, and a receive level of the pico remote radio unit 901 corresponding to the drive test event when the pico remote radio unit receives a signal of the drive test terminal 902 is also recorded in the drive test information on the network management system side. The network management system server 903 associates the measurement information on the network management system side and the drive test information on the terminal side based on the measurement event identifier. The network management system server 903 obtains the pico remote radio unit position information through calculation by using the field strength positioning algorithm and based on the terminal position information and the receive level of the pico remote radio unit 901, and binds the pico remote radio unit identifier and the pico remote radio unit position information. The pico remote radio unit position information calculated by using the positioning algorithm may have some errors. However, the errors can be smoothed and precision can be improved by controlling a quantity of sampling points and using the fixed point measurement. The pico remote radio unit position information is used for device maintenance, which is much better than no pico remote radio unit position information 901.

This application further provides a computer-readable storage medium. The computer-readable storage medium stores an instruction. When the instruction is run on a computer, the computer is enabled to perform the described method for positioning a pico remote radio unit according to the foregoing embodiments.

This application further provides a computer program product including an instruction. When the computer program product is run on a computer, the computer is enabled to perform the described method for positioning a pico remote radio unit according to the foregoing embodiments.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium that can be stored by a computer, or a data storage device, such as a server or a data center, integrating one or more usable media. The usable medium may be a magnetic medium (such as, a floppy disk, a hard disk, or a magnetic tape), an optical medium (such as, a digital video disk (DVD)), a semiconductor medium (such as, a solid state drive Solid State Disk (SSD)), or the like.

It should be understood that, in various embodiments of this application, sequence numbers of the foregoing processes do not indicate an execution sequence. The execution sequence of the processes should be determined depending on functions and internal logic of the processes, and should not be construed as any limitation on the embodiments and/or implementation processes of the embodiments of this application.

In conclusion, the foregoing embodiments are merely used for describing the technical solutions of this application, but not for limiting this application. Although this application is described in detail with reference to the foregoing embodiments, persons of ordinary skill in the art should understand that they may still make modifications to the technical solutions described in the foregoing various embodiments or make equivalent replacements to some technical features thereof. In addition, the modifications or replacements do not make the essence of the corresponding technical solutions depart from the scope of the technical solutions of the various embodiments of this application.

What is claimed is:

1. A method for positioning pico remote radio units, wherein the method is applied to a system for positioning the pico remote radio units, the system for positioning the pico remote radio units comprises at least one pico remote radio unit, a drive test terminal, and a network management system server, and the method comprises:
   when the drive test terminal performs a drive test, obtaining, by the drive test terminal, drive test information that is on a terminal side and that is of a drive test event, wherein the drive test event occurs at least once;
   obtaining, by the network management system server, drive test information that is on a network management system side and that is of the drive test event, wherein the drive test information on the network management system side comprises a pico remote radio unit corresponding to the drive test event;
   obtaining, by the network management system server, a pico remote radio unit identifier based on measurement information on the network management system side; and
   obtaining, by the network management system server based on the measurement information on the network management system side and the drive test information on the terminal side, pico remote radio unit position information bound to the pico remote radio unit identifier.

2. The method according to claim 1, wherein the measurement information on the terminal side comprises a measurement event identifier and the pico remote radio unit position information, and
   the obtaining, by the drive test terminal, drive test information that is on a terminal side and that is of a drive test event comprises:
   obtaining, by the drive test terminal, pico remote radio unit layout information by using a pico remote radio unit design drawing;
   obtaining, by the drive test terminal, the pico remote radio unit and the measurement event identifier of the drive test event;
   determining, by the drive test terminal, the pico remote radio unit position information based on the pico remote radio unit and the pico remote radio unit layout information; and
   obtaining, by the drive test terminal, the measurement information on the terminal side based on the measurement event identifier and the pico remote radio unit position information.

3. The method according to claim 2, wherein the obtaining, by the network management system server, the pico remote radio unit identifier based on the measurement information on the network management system side comprises:
   obtaining, by the network management system server, the pico remote radio unit corresponding to the drive test event by parsing the measurement information on the network management system side; and
   obtaining, by the network management system server, the pico remote radio unit identifier of the pico remote radio unit based on preset pico remote radio unit configuration information and inventory information.

4. The method according to claim 3, wherein the drive test information on the network management system side further comprises the measurement event identifier, and
   the obtaining, by the network management system server based on the measurement information on the network management system side and the drive test information on the terminal side, pico remote radio unit position information corresponding to the pico remote radio unit identifier comprises:

associating, by the network management system server, the measurement information on the network management system side and the drive test information on the terminal side based on the measurement event identifier;

obtaining, by the network management system server, the pico remote radio unit position information by parsing the drive test information on the terminal side; and binding, by the network management system server, the pico remote radio unit identifier and the pico remote radio unit position information based on a preset binding algorithm.

5. The method according to claim 1, wherein the measurement information on the terminal side comprises a measurement event identifier and terminal position information, the drive test information on the network management system side further comprises the measurement event identifier and a receive level of the pico remote radio unit; and the obtaining, by the network management system server based on the measurement information on the network management system side and the drive test information on the terminal side, pico remote radio unit position information bound to the pico remote radio unit identifier comprises:

associating, by the network management system server, the measurement information on the network management system side and the drive test information on the terminal side based on the measurement event identifier;

obtaining, by the network management system server, the terminal position information by parsing the drive test information on the terminal side, and obtaining the receive level of the pico remote radio unit and the pico remote radio unit identifier by parsing the measurement information on the network management system side;

obtaining, by the network management system server, the pico remote radio unit position information through calculation by using a field strength positioning algorithm and based on the terminal position information and the receive level of the pico remote radio unit; and binding, by the network management system server, the pico remote radio unit identifier and the pico remote radio unit position information.

6. A system for positioning pico remote radio units, comprising:

at least one pico remote radio unit;

a drive test terminal configured to: when performing a drive test, obtain drive test information that is on a terminal side and that is of a drive test event, wherein the drive test event occurs at least once; and a network management system server configured to obtain drive test information that is on a network management system side and that is of the drive test event, wherein the drive test information on the network management system side comprises a pico remote radio unit corresponding to the drive test event;

the network management system server is further configured to obtain a pico remote radio unit identifier based on measurement information on the network management system side; and the network management system server is further configured to obtain, based on the measurement information on the network management system side and the drive test information on the terminal side, pico remote radio unit position information bound to the pico remote radio unit identifier.

7. The system according to claim 6, wherein the measurement information on the terminal side comprises a measurement event identifier and the pico remote radio unit position information;

the drive test terminal is further configured to obtain pico remote radio unit layout information by using a pico remote radio unit design drawing;

the drive test terminal is further configured to obtain the pico remote radio unit and the measurement event identifier of the drive test event;

the drive test terminal is further configured to determine the pico remote radio unit position information based on the pico remote radio unit and the pico remote radio unit layout information; and the drive test terminal is further configured to obtain the measurement information on the terminal side based on the measurement event identifier and the pico remote radio unit position information.

8. The system according to claim 7, wherein the network management system server is further configured to obtain the pico remote radio unit corresponding to the drive test event by parsing the measurement information on the network management system side; and the network management system server is further configured to obtain the pico remote radio unit identifier of the pico remote radio unit based on preset pico remote radio unit configuration information and inventory information.

9. The system according to claim 8, wherein the drive test information on the network management system side further comprises the measurement event identifier;

the network management system server is further configured to associate the measurement information on the network management system side and the drive test information on the terminal side based on the measurement event identifier;

the network management system server is further configured to obtain the pico remote radio unit position information by parsing the drive test information on the terminal side; and the network management system server is further configured to bind the pico remote radio unit identifier and the pico remote radio unit position information based on a preset binding algorithm.

10. The system according to claim 6, wherein the measurement information on the terminal side comprises a measurement event identifier and terminal position information, the drive test information on the network management system side further comprises the measurement event identifier and a receive level of the pico remote radio unit; and that the network management system server is further configured to obtain, based on the measurement information on the network management system side and the drive test information on the terminal side, pico remote radio unit position information bound to the pico remote radio unit identifier comprises:

the network management system server is further configured to associate the measurement information on the network management system side and the drive test information on the terminal side based on the measurement event identifier;

the network management system server is further configured to: obtain the terminal position information by parsing the drive test information on the terminal side, and obtain the receive level of the pico remote radio unit and the pico remote radio unit identifier by parsing the measurement information on the network management system side;

the network management system server is further configured to obtain the pico remote radio unit position information through calculation by using a field strength positioning algorithm and based on the terminal position information and the receive level of the pico remote radio unit; and the network management system server is further configured to bind the pico remote radio unit identifier and the pico remote radio unit position information.

11. A non-transitory computer-readable storage medium, comprising instructions, which when executed by one or more computer processing systems, cause the one or more computer processing systems to perform operations for positioning pico remote radio units, comprising:

when a drive test terminal performs a drive test, obtaining, by the drive test terminal, drive test information that is on a terminal side and that is of a drive test event, wherein the drive test event occurs at least once;

obtaining, by a network management system server, drive test information that is on a network management system side and that is of the drive test event, wherein the drive test information on the network management system side comprises a pico remote radio unit corresponding to the drive test event;

obtaining, by the network management system server, a pico remote radio unit identifier based on measurement information on the network management system side; and obtaining, by the network management system server based on the measurement information on the network management system side and the drive test information on the terminal side, pico remote radio unit position information bound to the pico remote radio unit identifier.

12. The non-transitory computer-readable storage medium according to claim 11, wherein the measurement information on the terminal side comprises a measurement event identifier and the pico remote radio unit position information, and the obtaining, by the drive test terminal, drive test information that is on a terminal side and that is of a drive test event comprises:

obtaining, by the drive test terminal, pico remote radio unit layout information by using a pico remote radio unit design drawing;

obtaining, by the drive test terminal, the pico remote radio unit and the measurement event identifier of the drive test event;

determining, by the drive test terminal, the pico remote radio unit position information based on the pico remote radio unit and the pico remote radio unit layout information; and obtaining, by the drive test terminal, the measurement information on the terminal side based on the measurement event identifier and the pico remote radio unit position information.

13. The non-transitory computer-readable storage medium according to claim 12, wherein the obtaining, by the network management system server, the pico remote radio unit identifier based on the measurement information on the network management system side comprises:

obtaining, by the network management system server, the pico remote radio unit corresponding to the drive test event by parsing the measurement information on the network management system side; and obtaining, by the network management system server, the pico remote radio unit identifier of the pico remote radio unit based on preset pico remote radio unit configuration information and inventory information.

14. The non-transitory computer-readable storage medium according to claim 13, wherein the drive test information on the network management system side further comprises the measurement event identifier, and the obtaining, by the network management system server based on the measurement information on the network management system side and the drive test information on the terminal side, pico remote radio unit position information corresponding to the pico remote radio unit identifier comprises:

associating, by the network management system server, the measurement information on the network management system side and the drive test information on the terminal side based on the measurement event identifier;

obtaining, by the network management system server, the pico remote radio unit position information by parsing the drive test information on the terminal side; and binding, by the network management system server, the pico remote radio unit identifier and the pico remote radio unit position information based on a preset binding algorithm.

15. The non-transitory computer-readable storage medium according to claim 11, wherein the measurement information on the terminal side comprises a measurement event identifier and terminal position information, the drive test information on the network management system side further comprises the measurement event identifier and a receive level of the pico remote radio unit; and the obtaining, by the network management system server based on the measurement information on the network management system side and the drive test information on the terminal side, pico remote radio unit position information bound to the pico remote radio unit identifier comprises:

associating, by the network management system server, the measurement information on the network management system side and the drive test information on the terminal side based on the measurement event identifier;

obtaining, by the network management system server, the terminal position information by parsing the drive test information on the terminal side, and obtaining the receive level of the pico remote radio unit and the pico remote radio unit identifier by parsing the measurement information on the network management system side;

obtaining, by the network management system server, the pico remote radio unit position information through calculation by using a field strength positioning algorithm and based on the terminal position information and the receive level of the pico remote radio unit; and binding, by the network management system server, the pico remote radio unit identifier and the pico remote radio unit position information.

* * * * *